United States Patent [19]

Katz

[11] Patent Number: 4,834,551
[45] Date of Patent: May 30, 1989

[54] CALL HOLDING ALERT SYSTEM

[76] Inventor: James E. Katz, 39 Center Ave., Morristown, N.J. 07960

[21] Appl. No.: 3,371

[22] Filed: Jan. 14, 1987

[51] Int. Cl.[4] .................. H04M 1/00; H04M 1/64
[52] U.S. Cl. .................................. 379/68; 379/87; 379/77; 379/393
[58] Field of Search .............. 379/70, 74, 77, 84, 379/67, 162, 163, 393, 396, 372, 204

[56] References Cited

U.S. PATENT DOCUMENTS

| | | | |
|---|---|---|---|
| 2,506,279 | 5/1950 | Rowe | 379/372 |
| 3,214,523 | 10/1965 | Hess . | |
| 3,863,029 | 1/1975 | Zimmermann | 379/77 |
| 3,961,142 | 6/1976 | Caffine | 379/162 |
| 4,071,698 | 1/1978 | Barger, Jr. et al. . | |
| 4,197,426 | 4/1980 | Jacobson | 379/77 |
| 4,243,844 | 1/1981 | Waldman . | |
| 4,376,875 | 3/1983 | Beirne . | |
| 4,420,656 | 12/1983 | Freeman . | |
| 4,425,479 | 1/1984 | Dubner et al. | 379/84 |
| 4,468,528 | 8/1984 | Reece et al. . | |
| 4,514,593 | 4/1985 | Hattori et al. | 379/74 |
| 4,517,410 | 5/1984 | Williams et al. . | |
| 4,577,067 | 3/1985 | Levy et al. . | |
| 4,731,822 | 3/1988 | Berry, III et al. | 379/204 |

*Primary Examiner*—Alan Faber
*Assistant Examiner*—James E. Tomassini
*Attorney, Agent, or Firm*—Richard C. Woodbridge

[57] ABSTRACT

The system comprises an apparatus for signalling to a party on hold that the hold initiating party is ready to continue conversation. As soon as the hold initiating party places the other party on hold, the party on hold activates the system which causes a pre-recorded message to be transmitted back to the hold initiating party. The pre-recorded message invites the hold initiating party to produce a DTMF signal tone. The DTMF signal activates a tone detector which turns off the message generator and produces an audio and visual signal to alert the party on hold. In this manner the party on hold is free to pursue normal activities until such time as the hold initiating party is ready to talk.

6 Claims, 1 Drawing Sheet

CALL HOLDING ALERT SYSTEM

BACKGROUND OF THE INVENTION

1. Field of the Invention

The invention relates to a call holding alert system in which the party on hold is free to pursue normal activities until such time as the hold initiating party signals that the hold initiating party is ready to resume conversation.

2. Description of Related Prior Art

One of the more annoying features of modern life is to be placed on telephone "hold" for a long period of time. Being placed on hold for a long period of time is not only discourteous it is also tremendously time wasting. One intersecting device related to the efficient use of the dead time during a hold period is described in U.S. Pat. No. 4,577,067 entitled Remotely Controlled Telephone Hold Program System. According to that patent a system is provided for remote program selection by a held caller. When a line is being held by the holding circuit, a hold detector causes an announcement to be coupled to the held line instructing the held caller to select one of a plurality of programs. The held caller then sends program select signals, in the form of voice or tone data, which are decoded and used to select the desired program to be coupled to the held line. The system includes the ability of the held caller to control the volume level of the programs being supplied during the held period.

Other U.S. patents of possible relevance are: U.S. Pat. Nos. 3,214,513; 4,071,698; 4,243,844; 4,376,875; 4,420,656; 4,468,528 and 4,517,410.

SUMMARY OF THE INVENTION

Briefly described the system comprises an apparatus that permits a held party to go about his or her business until the hold initiating party causes an alarm to signal that the hold initiating party is ready to resume conversation. In typical operation, after initial telephone contact has been established, the remote hold initiating party will place the other party, sometimes referred to as the local party, or party on hold on the held party, on "hold". The held party then activates the system of the present invention by momentarily pressing an activate/deactivate contact button. A control logic circuit then sends an "on" signal to a message generator. The message generator produces audio signals that are fed through an amplifier and a telephone interface circuit to the telephone receiver of the hold initiating party. A continuously repeating message is generated by the message generator informing the hold initiating party that in order to reestablish contact with the party on hold it will be necessary for the hold initiating party to produce a certain predetermined DTMF dial tone. The DTMF dial tone when received by the system is detected by a tone detector which turns off the message generator and turns on an alarm. The alarm which can be either audio or visual or both, signals the party on hold that the hold initiating party is ready to resume conversation. The party on hold then de-activates the system by pressing the activate/de-activate contact button a second time and picks up the receiver, thereby resuming normal discourse.

These and other features of the present invention will be more fully understood by reference to the following drawing.

DETAILED DESCRIPTION OF THE INVENTION

Figure 1:
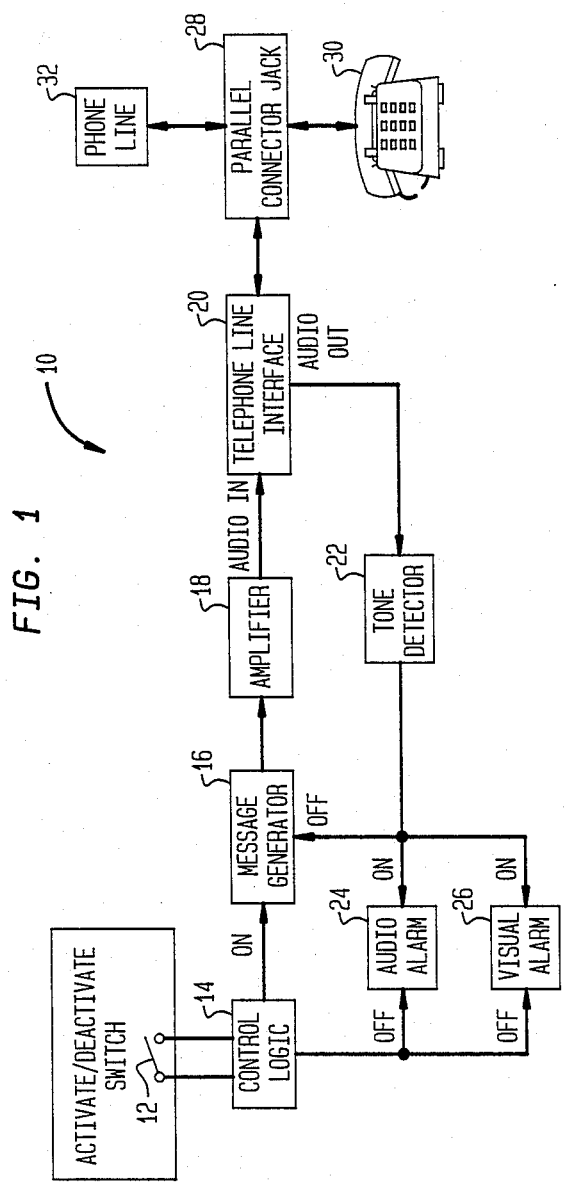
FIG. 1 is a schematic illustration of the preferred embodiment of the call holding alert system invention.

The call holding alert system 10 of the present invention according to the preferred embodiment thereof is schematically illustrated in FIG. 1. An activate/deactivate switch 12 drives control logic circuit 14. Initial activation of control logic circuit 14 causes message generator 16 to turn on. Message generator 16 preferably comprises a magnetic tape player having a prerecorded endless loop message thereon. The message generator 16 continuously plays until deactivated by tone detector 22. Alternatively, message generator 16 could comprise a pre-programmed solid state speech synthesis integrated circuit for generating repeatable short messages. This alternative integrated circuit could be enabled and disabled in the same fashion as the tape player 16 of the preferred embodiment 10. The output message from message generator 16 is amplified by amplifier 18 and transmitted through telephone line interface circuit 20 to a standard parallel connector jack 28. Connector jack 28 also couples a conventional telephone 30 to the telephone line system 32. Tone detector 22 is connected to telephone line interface 20 and is adapted to detect a single predetermined DTMF dial tone as transmitted from a remote party over telephone line 32. Activation of tone detector 22 turns off the continuous message generator 16 and turns on audio alarm 24 and visual alarm 26. Alarms 24 and 26 remain on until activate/deactivate switch 12 is closed for the second time causing the control logic 14 to turn off alarms 24 and 26.

In operation the system performs in the following manner. Initially normal contact is established between a first local party and a remote party. If the remote party, also referred to as the hold initiating party, places the local party, also referred to as the party on hold [or the local party or the held party], on hold, then the party on hold will activate switch 12. Activation of switch 12 causes control logic 14 to activate continuous message generator 16. Message generator 16 then produces a continuous verbal message instructing the remote hold initiating party that the local party on hold is not at the telephone but, if the hold initiating party wishes to talk to the party on hold, then he or she should produce a specific predetermined DTMF tone at the remote location. If the remote hold initiating party produces the correct DTMF tone, then that tone will be detected by tone detector 22. Tone detector 22 then disables continuous message generator 16 and turns on audio alarm 24 and visual alarm 26. Activation of alarms 24 and 26 causes the local party on hold to return to the phone. The party on hold then deactivates the system by closing the contact button switch 12 for a second time, thereby turning off alarms 24 and 26. Thereafter both parties can resume normal telephone conversation.

The invention 10 can also be used in several other fashions. For example, suppose that the user wishes to contact a remote party not yet at the phone (for example, before business opens or when a spouse is away from home or on errands). By activating the present system 10, the local user can either (a) send a message to a remote party that the local user wishes to speak with him or her, or (b) leave a message with a remote party who can then verify by the system 10 of the present invention that the message has been received. Under the second scenario (b), the local use need not be near the system 10 or telephone after the system 10 has been activated. More specifically the local user uses the invention in the following manner and by applying the following steps:

1. The local user places a call;
2. There is no answer;
3. The local user activates the system 10 which continues ringing the sought remote parties telephone line;
4. Upon arriving at home or office the remote party picks up the phone and hears the message advising of the initiating users call. The user will have structured the message so as to produce one of two results. Either the pre-recorded message informs the remote party to depress a key to alert the local user that the remote party is available to speak with the user or, if the local user has left, the remote party after receiving the pre-recorded message, is told to depress a key to confirm receipt of the message. Different customer response keys may also be available. For example, the device could be programmed to receive "yes" and "no" responses.
5. The present invention 10 may also be used periodically. For example, it might activate itself and ring the remote party for one minute at fifteen minute intervals. It would continue that cycle until the sought remote party answers or the local user deactivates the device.

The following items comprise the hardware of the present system:

| System Element | Manufacturer | Model No |
| --- | --- | --- |
| Activate/deactivate switch 12 | Radio Shack | 275-709 |
| Control Logic 14 | RCA | CD 4013 |
| Message Generator 16 and Amplifier 18 | Sony Tape Recorder and Radio Shack Endless Loop Tape Cassette | TCM-121 or 43-405 |
| Telephone Line Interface 20 | Novations | 49278 |
| Tone Detector 22 | Mitel or GTE | MT 8870 or G8870 |
| Audio Alarm 24 | Radio Shack | 273-053 |
| Visual Alarm 26 | Radio Shack | 272-704 |
| Parallel Connector Jack 28 | Radio Shack | 279-357 |

While the invention has been described with reference to the preferred embodiment, it will be appreciated by those of ordinary skill in the art that various changes can be made to the parts and structure that comprise the invention without departing from the spirit and scope thereof.

I claim:

1. A telephone call holding alert system for alerting a local party on hold that the remote hold initiating party is ready to talk, said system comprising:

telephone interface means for connecting said system to a telephone network and for transmitting and receiving information to and from said telephone network;

activating means for activating said system by said local party after said local party has been put on hold by said remote party;

detector means connected to said telephone interface means for detecting a predetermined signal generated by the remote party indicating that the remote party is ready to talk, said detector means comprising a tone detector means for detecting a dual-tone multifrequency DTMF, signal from said remote party;

message generating means connected to said activating means and said telephone interface means for generating a verbal message to inform said remote party on how to generate said predetermined signal such that activating of said activation means by said local party causes said message generating means to generate said verbal message to said remote party; and, alarm means connected to said tone detector means for alerting said local party that said remote party is ready to talk, wherein said local party activates said activating means which in turn activates said message generator means to produce said verbal message for said remote party after said remote party has placed said local party on hold and further wherein said remote party in response to said verbal message produces said DTMF tone which is detected by said tone detector means which in turn causes said alarm means to warn said local party that said remote party is ready to talk.

2. The system of claim 1 wherein said alarm means comprises:
an audio alarm.

3. The system of claim 1 wherein said alarm means comprises:
a visual alarm.

4. The system of claim 1 wherein said message generating means comprises:
a tape player with a pre-recorded message.

5. The system of claim 1 wherein said message generating means comprises:
a solid state speech synthesis integrated circuit.

6. The system of claim 1 further comprising:
control logic means connected to said activating means and said message generating means for controlling said system.

* * * * *